US012564208B2

(12) United States Patent　　　　(10) Patent No.: US 12,564,208 B2
Jilesen et al.　　　　　　　　　　　　(45) Date of Patent: Mar. 3, 2026

(54) ROTARY MOULD DRUM SYSTEM CONFIGURED FOR USE IN AN INSTALLATION FOR MOULDING FOOD PRODUCTS FROM A PUMPABLE FOODMASS

(71) Applicant: MAREL FURTHER PROCESSING B.V., Boxmeer (NL)

(72) Inventors: Wilhelmus Josephus Gerardus Maria Jilesen, Boxmeer (NL); Mathias Marcellus Kuijpers, Boxmeer (NL); Johannes Martinus Meulendijks, Boxmeer (NL)

(73) Assignee: MAREL FURTHER PROCESSING B.V., Boxmeer (NL)

( * ) Notice: Subject to any disclaimer, the term of this patent is extended or adjusted under 35 U.S.C. 154(b) by 516 days.

(21) Appl. No.: 18/007,972

(22) PCT Filed: Jun. 8, 2021

(86) PCT No.: PCT/EP2021/065246
§ 371 (c)(1),
(2) Date: Dec. 2, 2022

(87) PCT Pub. No.: WO2021/249981
PCT Pub. Date: Dec. 16, 2021

(65) Prior Publication Data
US 2023/0248047 A1　　Aug. 10, 2023

(30) Foreign Application Priority Data
Jun. 8, 2020　(NL) ..................................... 2025770

(51) Int. Cl.
*A23P 30/10*　　　(2016.01)
*F16C 13/02*　　　(2006.01)

(52) U.S. Cl.
CPC ............ *A23P 30/10* (2016.08); *F16C 13/024* (2013.01)

(58) Field of Classification Search
CPC ...................................................... A23P 30/10
See application file for complete search history.

(56) References Cited

U.S. PATENT DOCUMENTS 2,235,492 A * 3/1941 Weidenmiller ........ A21C 11/08
　　　　　　　　　　　　　　　　　　　425/436 R
3,416,466 A * 12/1968 Weidenmiller ........ A21C 11/08
　　　　　　　　　　　　　　　　　　　425/298
(Continued)

FOREIGN PATENT DOCUMENTS

WO　　2005107481 A2　11/2005
WO　　2014118368 A2　8/2014

OTHER PUBLICATIONS

Search Report from corresponding Netherlands Patent Application No. NL2025770, Jan. 29, 2021.
(Continued)

*Primary Examiner* — Timothy Kennedy
(74) *Attorney, Agent, or Firm* — Workman Nydegger

(57)　　　　ABSTRACT

A mould drum system configured for use in an installation for moulding food products from a pumpable foodstuff mass while the drum is rotating a mould drum around a longitudinal rotation axis by a driving unit. A support device is connected to the frame structure, having an inner side, the support device being moveable relative to the frame structure between an open position and a closing position. A shaft is provided having a mounting side at which it is mounted to the frame and an opposite free end.

14 Claims, 5 Drawing Sheets

(56)                References Cited

U.S. PATENT DOCUMENTS

| | | | | |
|---|---|---|---|---|
| 3,991,440 | A | 11/1976 | Hendrickson, Jr. | |
| 4,528,907 | A * | 7/1985 | Davison | B41F 31/308 |
| | | | | 101/352.04 |
| 4,630,426 | A * | 12/1986 | Gentry | B65B 9/04 |
| | | | | 53/546 |
| 5,102,238 | A | 4/1992 | Contzen | |
| 5,669,302 | A | 9/1997 | Rogge et al. | |
| 5,967,043 | A * | 10/1999 | Mayr | B41F 31/36 |
| | | | | 101/247 |
| 8,622,730 | B2 * | 1/2014 | Suski | A21C 11/10 |
| | | | | 425/281 |
| 9,359,765 | B2 * | 6/2016 | Svec | B05D 5/02 |
| 10,182,575 | B2 * | 1/2019 | Van Gerwen | A21C 5/003 |
| 10,238,122 | B2 * | 3/2019 | Van Gerwen | A22C 7/0069 |
| 12,343,771 | B2 * | 7/2025 | Van Erp | B08B 3/08 |
| 2012/0003374 | A1 * | 1/2012 | Van Der Eerden | A23P 30/10 |
| | | | | 426/513 |
| 2012/0058213 | A1 * | 3/2012 | Lindee | A22C 7/0038 |
| | | | | 425/135 |
| 2012/0177786 | A1 * | 7/2012 | Van Der Eerden | A22C 7/0069 |
| | | | | 426/89 |
| 2013/0224357 | A1 * | 8/2013 | Van Gerwen | A22C 7/0092 |
| | | | | 426/513 |
| 2013/0273192 | A1 * | 10/2013 | Van Gerwen | B66F 9/187 |
| | | | | 425/317 |
| 2013/0280393 | A1 * | 10/2013 | Van Gerwen | A23P 30/10 |
| | | | | 426/389 |
| 2013/0337128 | A1 * | 12/2013 | Van Gerwen | A22C 7/0038 |
| | | | | 156/60 |
| 2015/0044335 | A1 * | 2/2015 | Meulendijks | A22C 7/0069 |
| | | | | 426/512 |
| 2015/0359231 | A1 * | 12/2015 | Van Gerwen | A22C 7/0069 |
| | | | | 425/331 |
| 2019/0053498 | A1 | 2/2019 | Van Gerwen et al. | |
| 2019/0053499 | A1 | 2/2019 | Van Gerwen et al. | |
| 2019/0289862 | A1 | 9/2019 | Verouden et al. | |

OTHER PUBLICATIONS

International Search Report from corresponding PCT Application No. PCT/EP2021/065246, Sep. 17, 2021.

* cited by examiner

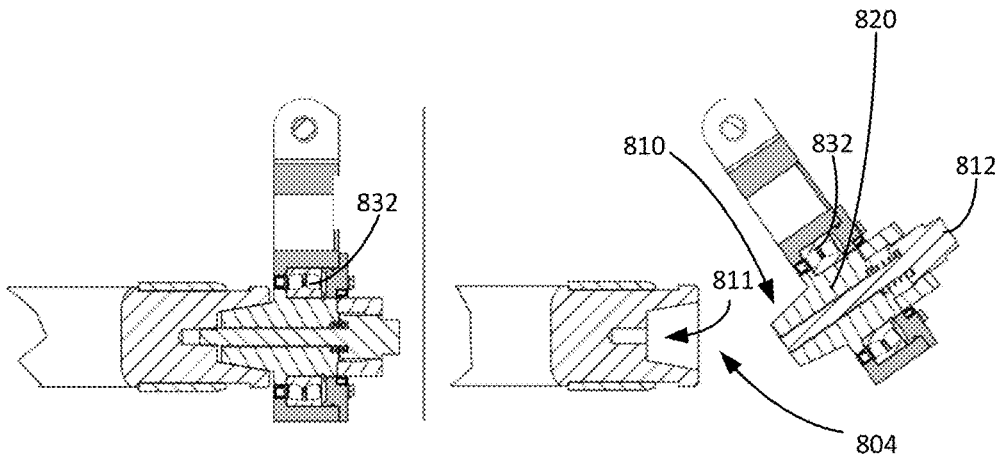
Fig. 8
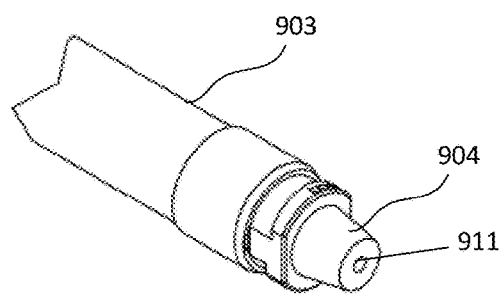
Fig. 9
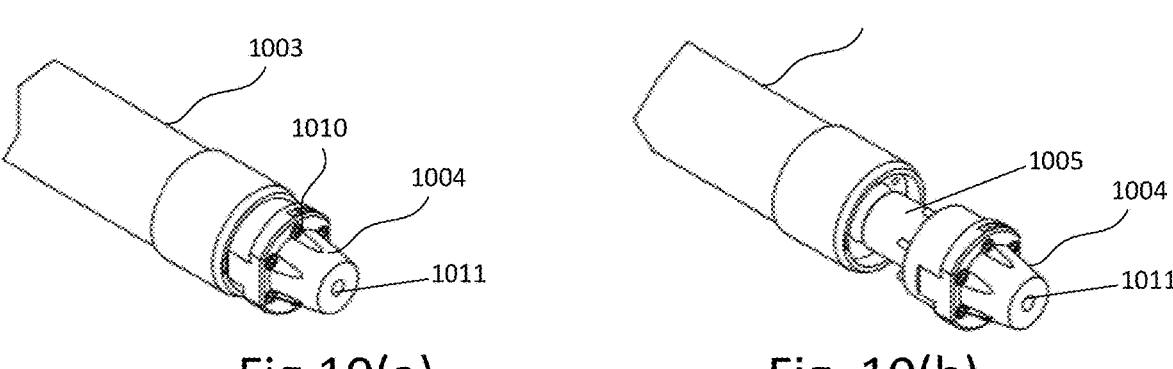
Fig.10(a)         Fig. 10(b)
Fig. 10

ROTARY MOULD DRUM SYSTEM CONFIGURED FOR USE IN AN INSTALLATION FOR MOULDING FOOD PRODUCTS FROM A PUMPABLE FOODMASS

FIELD OF THE INVENTION

The present invention relates to a rotary mould drum system, a food processing system and a method for manufacturing moulded food products from a pumpable foodstuff mass while rotating a mould drum around a longitudinal rotation axis by a driving unit.

BACKGROUND OF THE INVENTION

Rotary mould drum systems for moulding food products are known in the art. Such a rotary mould drum system is as an example described in WO2005107481 and shown in FIG. 1, which comprises a mass feed member 103, a mould drum 101 and a shaft 104. The mould drum 101 is used for moulding food products from a pumpable foodstuff mass of one or more food starting materials. The mould drum 101 shown here has on the outer side a permeable mould tube with groups of multiple mould cavities 102 that define the geometrical shape of the moulded food products.

The mould drum is hollow 107 with a circular cross section to allow it to be slideable attached to the shaft 104 and attached to a mounting side 105 of the shaft. The mounting side is connected to a driving unit 106 that drives the drum in a rotational movement along a horizontal rotation axis.

When preparing the system for food processing, the mass feed member 103 is moved from the open position shown here, to a closing position where it engages with the outer surface of the mould drum 101 such that an inner partly deformable side of the mass feed member (sometimes referred as a shoe plate) partly circumferentially covers the mould drum. Subsequently, the free end of the shaft is closed using e.g. a closing lid (not shown) that is attached to the mass feed member 103 in a hinge like manner. During use, high pressure is applied by a pressure means on the mass feed member and thus onto the mould drum.

To ensure that the mould drum can rotate, a bearing construction is provided at the free end of the shaft 104.

In one solution, the shaft 104 has a hollow cylindrical like portion on the non-drive end (the free end) into which the bearing construction is incorporated by placing it on the inner side of the hollow circular portion, which may be referred to as a hub. Subsequently, the free end of the shaft is closed using a supporting device, where the support device has a static pin with outer cone, which can be screwed in and out the hub. The bearings enable the hub to be supported by the static pin, while the main shaft is rotating.

Another solution is to use a top bearing construction on the non-driven side of the shaft. In order to allow the drum to be slideable attached to the shaft, the total diameter of the shaft with the outer circumferentially arranged bearing construction must be less than the inner diameter of the mould drum 107. After sliding the mould drum on the shaft 104, the free end of the shaft is closed using the supporting device, which on its inner side has a cylindrical structure (or a portion of a cylindrical structure) that at least circumferentially surrounds the bearing construction and this allows the drum to rotate.

Both these bearings construction scenarios apply for mould drums that range from maximum effective forming width of 400 mm-700 mm.

Considering the weight of these moulding drums, and the high pressure supplied by the mass feed member 103 on the mould drums during use, the load rating on these bearing constructions are close to have reached their upper limit. As an example the force supplied from the mass feed member on a 700 mm drum is around 120 kN.

Today, there is an increase need in using larger drums, such as 1000 mm drums, to increase the throughput in the food processing. This means that the force from the mass feed member on the drum will increase significantly, e.g. from 120 kN up to 180 kN (1000 mm). These higher forces require bearings with larger load ratings, which requires larger bearing construction with a larger diameter.

In current solutions for mould drums ranging from 400-700 mm in length the available space for applying bearings with appropriate load ratings is limited, since the construction of the bearings may not exceed the inner diameter of the mould drum.

SUMMARY OF THE INVENTION

On the above background it is an object of embodiments of the present invention to provide an alternative solution of a mould drum system that overcomes the above mentioned problem that has a bearing construction having sufficient load ratings for such larger for mould drums, e.g. 1000 mm long mould drums.

In general, the invention preferably seeks to mitigate, alleviate or eliminate one or more of the above mentioned disadvantages of the prior art singly or in any combination. In particular, it may be seen as an object of embodiments of the present invention to provide a rotary mould drum system that solves the above mentioned problems, or other problems.

Accordingly, the fact that the bearing construction is now integrated into the support device instead of on the free end side of the shaft, the hollow cylindrical mould drum no longer has to slide over the bearing construction when installing or removing the forming drum from the mould drum system. This means that the above-mentioned limitations in the diameter of the bearing construction are no longer present and bearing constructions with sufficient load ratings may easily be selected when e.g. expanding the drum size to a drum having maximum effective forming width of 1000 mm.

The shaft is in one embodiment a cylindrical shaft and where an inner surface of the hollow mould drum is cylindrical having a diameter being larger or substantially the same as an outer diameter of the cylindrical shaft.

In an embodiment, the first structure comprises a first tapering structure, such as a first cone structure, and where the second structure comprises a second tapering structure, such as a second cone structures. In an embodiment, the first and the second cone structures are truncated cone structures. Accordingly, it is thus ensured that the connection between the first and the second structures is smooth and "play-free" that at the same time ensures an optimal fit and stability between the free end of the shaft and the support device. In an embodiment, the second tapering structure is a hollow tapering structure, but this may just as well apply vice versa, i.e. that the first tapering structure is hollow.

In an embodiment, the rotary mould drum system further comprises a mass feed member device having an inner partly deformable side (which may be referred to as a "shoe plate")

and an outer framework side, the mass feed member device being pivotable attached to the frame structure and is configured to be moved between an open position and a closing position, the open position being a position where the mass feed member device is in non-contact with the mould drum when being slideable attached to the shaft, the closing position being when the inner partly deformable side circumferentially surrounds the mould drum longitudinally along the mould drum and supplies a pressure thereon, i.e. it is able to follow the outer circumference of the drum, wherein the support device is attached to the outer framework side of the mass feed member device, and where moving the support device to the closing position occurs when the mass feed member device is in the closing position. The sequence of actions, to move the mass feed member to a closing position, where the mass feed member is closed to e.g. the frame structure, and subsequently, move the support device to a closing position, facilitates the preparation procedure when using the mould drum system in producing moulded food product, and also ensures an accurate positioning between the second structure of support device first structure.

In an embodiment, the support device comprises a lid and where the inner side of the support device is an inner side of the lid. In a preferred embodiment the lid is pivotable mounted to the outer framework side of the mass feed member device, and where the open position of the support device is where the lid is in an open position, and where the closing position is where the lid and the mass feed member device are in a closing position. As an example, if the lid comprises a hollow inner cone, or hollow truncated cone, and the lid is pivoted away from and outer cone of the shaft, it is ensured that the inner cone, including bearing construction, does not interfere with the outer cone of the shaft when opening (or closing) the mass feed member. This may of course apply vice versa, if the lid comprises an outer cone and the shaft comprises an inner cone at its free end.

In an embodiment, the first structure may be a truncated structure, or a cone structure, or a truncated cone structure, having a cylindrical opening therein, and where the support device comprises a locking mechanism comprising a pin structure, where the inner diameter of the cylindrical opening is essentially the same as the outer diameter of the pin structure. In an embodiment, the inner side of the cylindrical opening has a threaded portion corresponding to a threaded portion on the surface of the pin structure. The pin structure may be moveable between an open position to a closing position, the closing position being where the pin structure penetrates or is screwed into the cylindrical opening resulting in that the support device is in a closing position. Accordingly, a simple and secure solution is provided for fixing the end of the first tapering structure of the shaft with the hollow second tapering structure (incl, bearing) of the support device.

In an embodiment, the first structure, e.g. said first tapering structure, or truncated cone structure, is removable from the shaft, and in another alternative the first tapering structure is incorporated into the shaft, e.g. such that it is an integral part of the shaft.

In one embodiment, the support device comprises a bushing mould, and wherein the second complementary structure is formed at an inner side of a bushing mould and defines a hollow complementary structure, where the bearing construction is integrated into the support device at an outer side of the bushing mould. In another embodiment, the support device comprises a cylindrical structure having outwardly protruding portion defining the second complementary structure, where the bearing construction is integrated into the support device at an outer side of the cylindrical structure.

The present invention also relates to a food processing system for moulding food products from a pumpable foodstuff mass.

Accordingly, a system is provided that is capable of utilizing larger mould drums, e.g. 1000 mm drums since now the restrictions of sliding the drums over the bearing constructions is no longer an issue.

In one embodiment, the mass feed member is moveable from the closed position, defining a zero-degree position, to approximately 180 degrees position. This facilitates cleaning the mass feed member.

The present invention also relates to a method for manufacturing moulded food products from a pumpable foodstuff mass using the food processing system.

In general, the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which FIG. 8 shows one embodiment of a shaft and a truncated cone structure, FIGS. 9 and 10 show another embodiment where a truncated cone structure removable from the shaft.

DESCRIPTION OF EMBODIMENTS

FIGS. 2-5 show a perspective view of a rotary mould drum system 200 according to the present invention, configured for use in an installation for moulding food products from a pumpable foodstuff mass, while rotating a mould drum 310 around a longitudinal rotation axis by a driving unit 230 placed within a housing 208.

Figure 1:
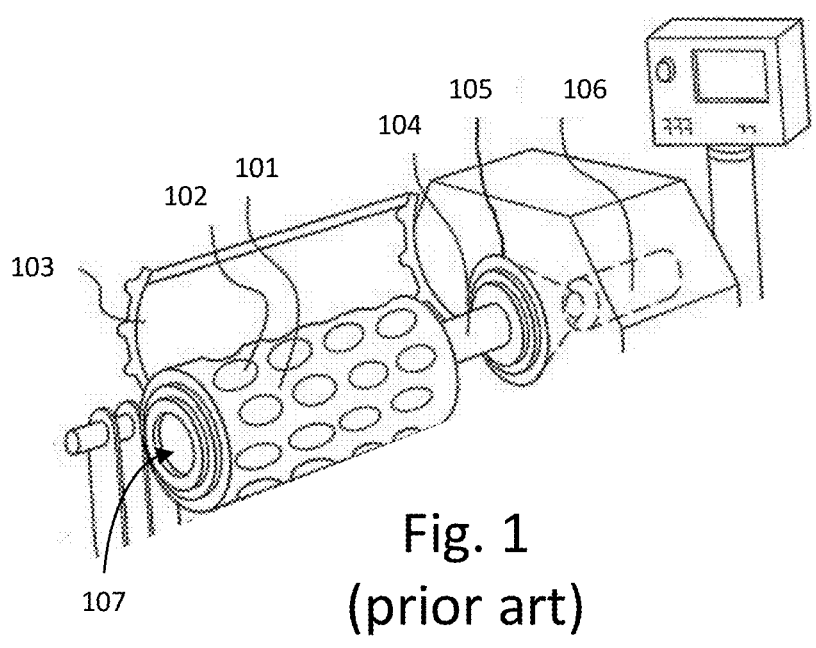
FIG. 1 shows a prior art mould drum system.
Figure 2:
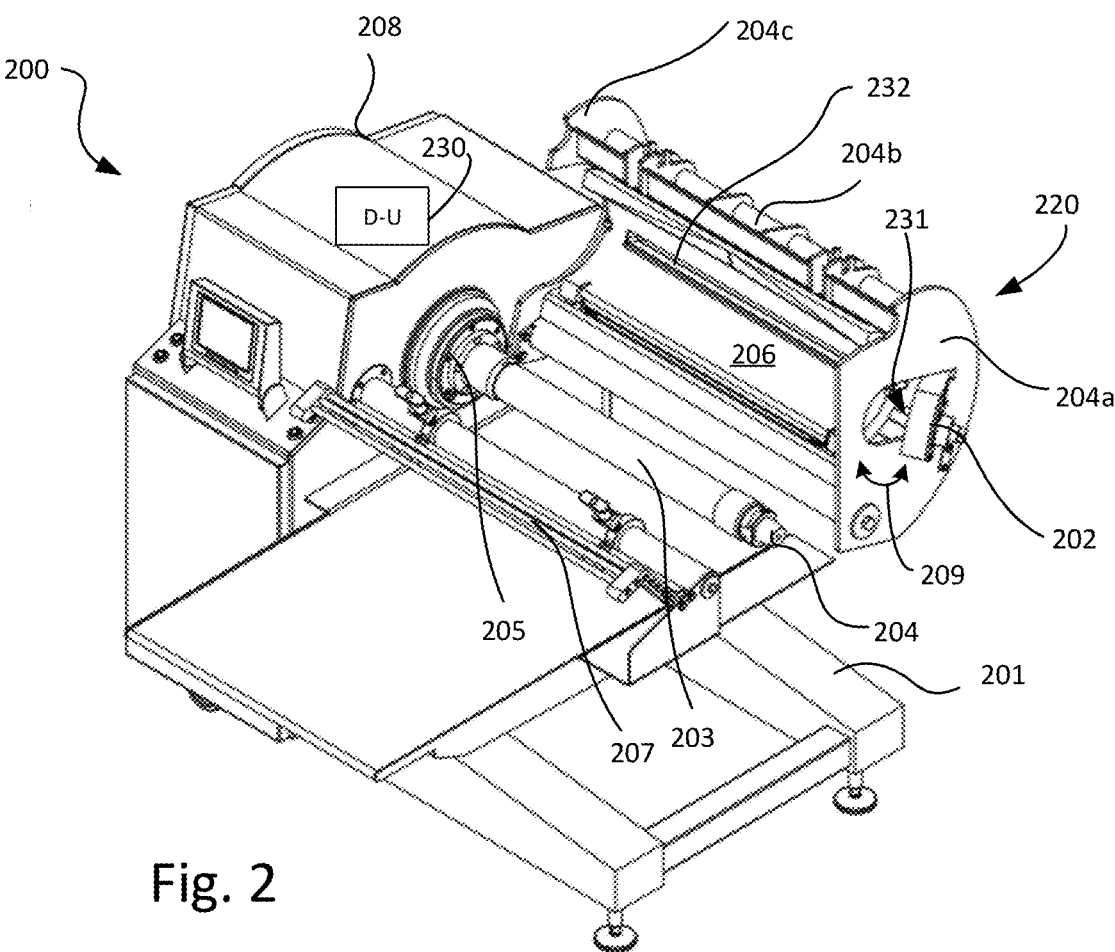
FIGS. 2-5 show a perspective view of a rotary mould drum system according to the present invention.

FIG. 2 shows the mould drum system in the absence of the mould drum comprising a shaft 203 having a mounting side 205 that is connected to the driving unit 230 placed within a housing 208 and an opposite free end 204.

The system further comprises a mass feed member device 220 which is shown here in an open position relative to the shaft 203 having an outer frame structure comprising an elongated outer frame side 204b and oppositely arranged side frames 204a,c mounted to the outer frame side 204b, an inner deformable member 206 (which may also be referred to as a shoe plate) and a mouth 232.

The support device 202, which as shown here is a lid structure, is attached to side frame 204a such that the support device 202 is moveable in e.g. a hinge like manner between an open position as shown here and a closing position as indicated by arrow 209.

As will be discussed in more details later, the free end of the shaft 203 comprises a first structure and the inner side 231 of the support device comprises a second structure (not shown), where the geometry of the first structure is essentially the same as the geometry of the second complementary structure such that the first structure and the second complementary structure fit into each other when the support device is in the closing position.

In the embodiment shown here, the first structure is a first truncated cone structure 204, and the second structure on the inner side 231 of the support device 202 comprises a complementary second hollow truncated cone structure. Other structures are of course possible, such as, but not limited to, cone structure, semi-sphere structure and the like.

The system 200 further comprises a safety member 207 in an open position, but during use the safety member 207 is moved downwards (see FIG. 4) so that it acts in a way as a separation board between the system and an operator to ensure a proper distance there between.

Figures 3, 4:
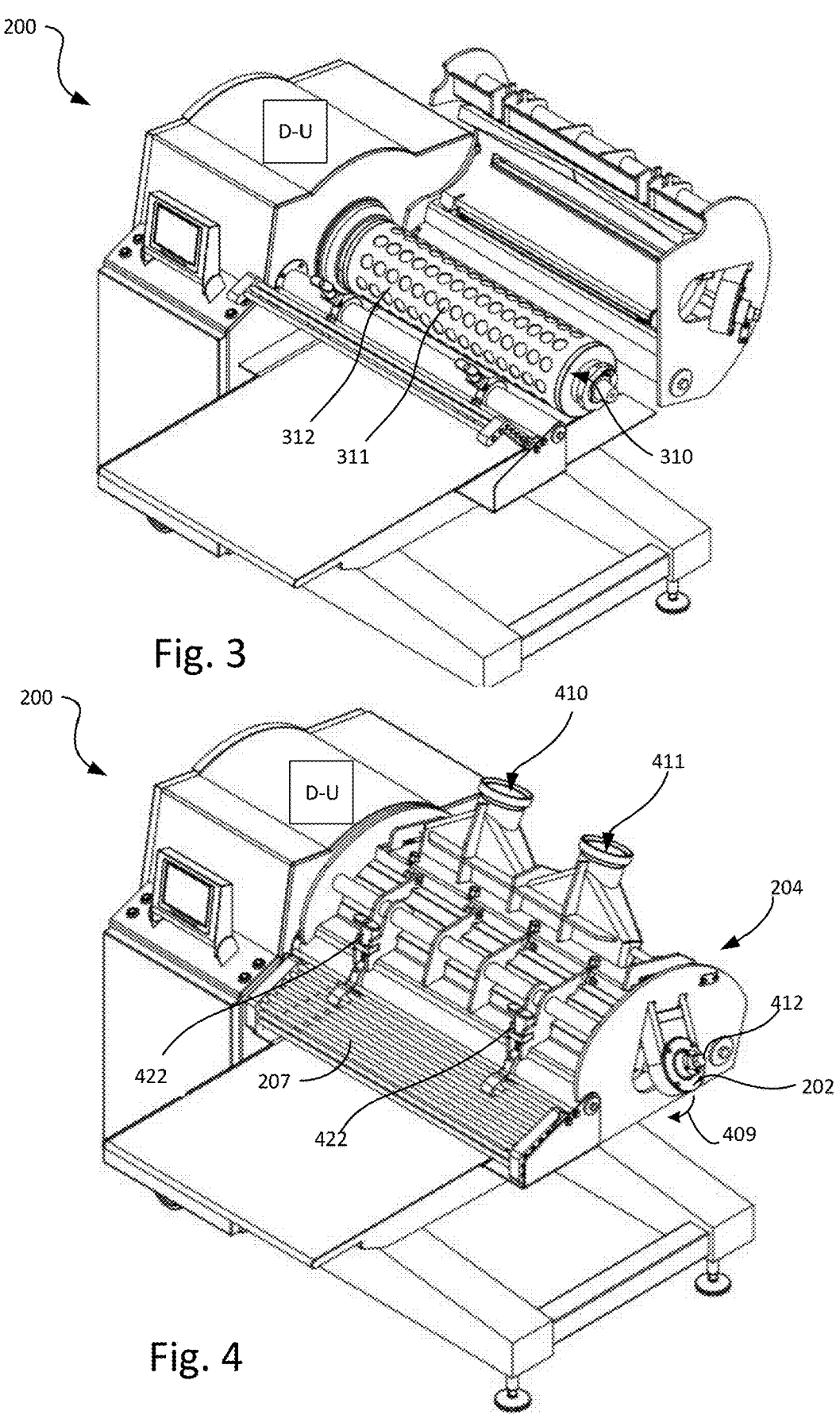

FIG. 3 shows the system 200 in FIG. 2 with a hollow cylindrical mould drum 310 that has been slideable attached to the shaft, and been mounted at the mounting side 205 of the shaft.

To ensure a proper fit between the shaft 203 and the hollow cylindrical mould drum the inner geometrical cross section of the mould drum 310 is essentially the same as the outer geometrical cross section of the shaft. As shown in this embodiment, the shaft is a cylindrical shaft such that the inner surface of the hollow mould drum is cylindrical having a diameter being larger or substantially the same as an outer diameter of the cylindrical shaft.

The mould drum comprises an outer mould drum surface 312 comprising plurality of mould cavities 311 having an opening in the drum surface, where these mould cavities define a geometrical shape of food products to be moulded.

FIG. 4 shows the mould drum system 200 where the mass feed member device 220 has been moved to a closing position, and locked via locking mechanism 422, and the safety member 207 has been moved to a closing position.

FIG. 4 further shows two inlet openings 410, 411 that are operable connected to the mouth 232 to allow a transfer of food mass from a food mass sources (not shown) into the two inlet openings and into the mould cavities via the mouth 232. The number of inlet openings should of course not be construed as being limited to two inlet openings; a single inlet opening could just as well be implemented as well as more than two inlet openings.

As shown here and will be discussed in more details later, the support device 202 further comprises a locking mechanism 412 that is in an open position.

Figures 5, 6, 6A, 6B, 7, 7A, 7B:
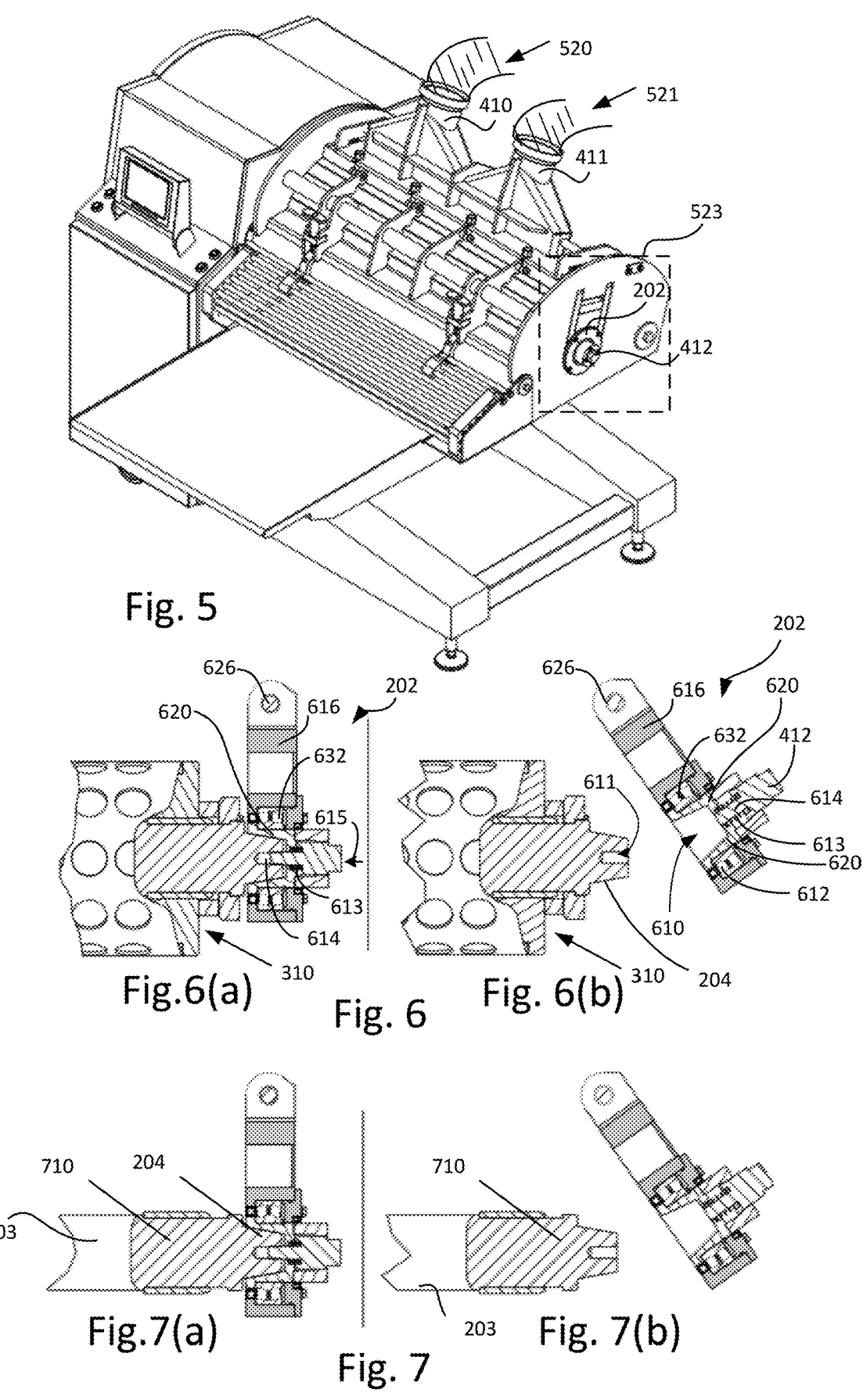
FIGS. 6 and 7 depict a simplified zoomed up side view of FIG. 5.

FIG. 5 shows where food mass sources 520, 521 have been coupled to the two inlet openings 410, 411, and where the support device 202 has been moved from the open position shown in FIG. 4 to the closing position as indicated by arrow 409, and where the locking mechanism 412 of the support device 202 has been pushed into a closing position.

During use, sufficient pressure must be applied between the deformable member 206 of the mass feed member device 220 and the mould drum 310, but this pressure can in case the drum is 1000 mm long be up to 180 kN or even higher. This may as an example be achieved by use of air bellows (not shown) placed within the mass feed member device 220 to provide a pressure onto the deformable member 206, or e.g. via external hydraulic driven jacks that supply a pressure onto the elongated outer frame side 204. Subsequently, the foodstuff mass is fed into mass feed member device via the two inlet openings 410, 411 and into the mould cavities 311, while rotating the mould drum along a horizontal rotation axis when the fill opening of a mould cavities is in communication with the mouth 232 at a proper fill position, resulting in forming food products in said mould cavities having geometrical size essentially corresponding to the geometrical size/shape of the mould cavities 311.

FIGS. 6 and 7 depict a simplified zoomed up side view of a dotted box 523 in FIG. 5, illustrating the engagement between the free end of the shaft 203 and the support device 202.

FIG. 6a depicts the scenario where the mould drum system is in a closed position as shown in FIG. 5, and FIG. 6b depicts the scenario where the mould drum system is in an open position as shown in FIG. 4.

As shown here, the support device 202 may be mounted to the mass feed member device via hinge 626 as discussed previously. Shown is the inner side of the support device comprising a hollow second tapering structure 610, i.e. a hollow truncated cone structure, where the geometrical outer surface of the first tapering structure 204, i.e. the truncated cone, is essentially the same as the inner geometrical surface of the hollow second tapering structure 610 such that the first tapering structure fits into the hollow second tapering structure when the support device is in the closing position as shown in FIG. 6a.

The locking mechanism 412 comprises a pin structure 614 connected to a spring load 613. The spring load may be considered as being an optional feature, but in this embodiment the role of the spring load may be to ensure that in the absence from an external force from e.g. an operator, the locking position is in an open position as shown in FIG. 6b.

When moving the support device 202 to the closing position it is followed by means of pushing onto the outwardly exposed side of the locking device the spring load becomes compressed and the pin structure 613, which may comprise a threaded neck portions may be screwed into hollow opening 611, having corresponding threaded neck on its inner side, until the locking mechanism is closed.

The support device comprises a bushing mould 620, and wherein the second complementary structure, as shown here the hollow truncated cone structure, is formed at an inner side of a bushing mould 620.

Shown is also a bearing construction 632 integrated into the support device at an outer side of the bushing mould 620. During rotation of the drum 310 (portion of the surface of the drum has been "cut out" to enhance the visibility of the first tapering structure) the drum and the striped areas (e.g. 204, 412, 620) rotate, whereas the solid grey color 616 represent parts of the support device 202 that are stationary.

FIG. 8 shows an embodiment similar to the embodiment shown in FIG. 7, but where the first and the second tapering structures having been reversed, namely where the first tapering structure is hollow conical shaped structure 811 (a truncated cone as shown here) and where the second truncated structure is a truncated cone 810, and where the locking mechanism 802 is comprised in the support device as discussed previously.

Moreover, the support device comprises a cylindrical structure having outwardly protruding portion defining the second complementary structure 810, where the bearing construction 832 is integrated into the support device at an outer side of the cylindrical structure.

FIG. 9 shows one embodiment of a shaft 903 and a truncated cone structure 904 having an opening 911 as discussed in relation to FIGS. 6 and 7, where the truncated cone structure 904 is fixed to the shaft.

FIG. 10 shows another embodiment where a truncated cone structure 1004, also having an opening 1011 for similar purposes as discussed previously, is removable as shown in FIG. 10b from the shaft 1003 by sliding it from a shaft portion 1005, where the shaft portion has a diameter being less than the diameter of the shaft 1003, so as to ensure that after placing the truncated cone structure 1004 on the shaft, the resulting diameter will be essentially the same as the diameter of the shaft.

Figures 11, 12:
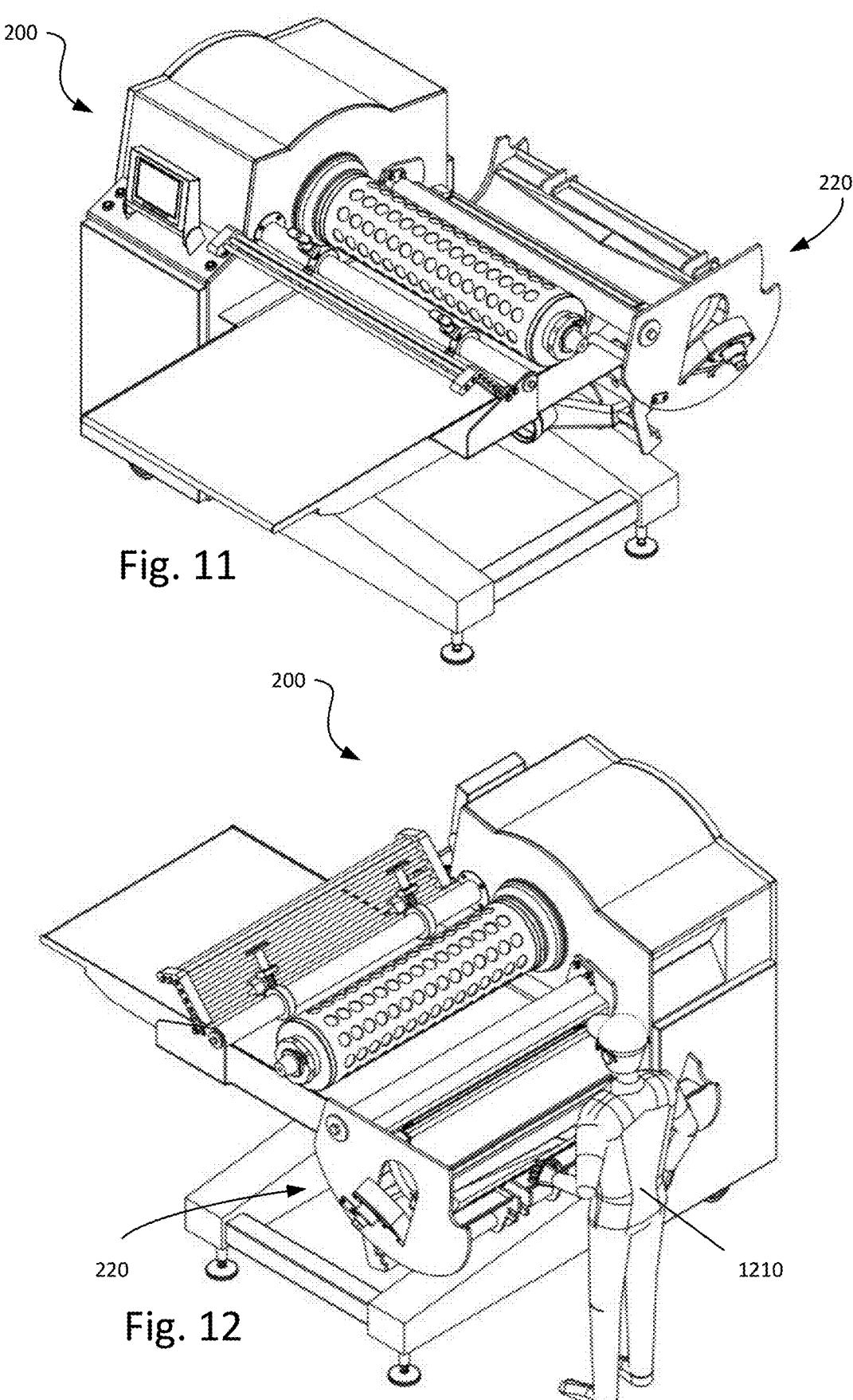
FIGS. 11 and 12 show the rotary mould drum system discussed in relation to FIGS. 2-5, showing where the mass feed member device has been rotated 180 degrees to facilitate cleaning the mass feed member.

FIGS. 11 and 12 show the rotary mould drum system 200 discussed in relation to FIGS. 2-5, showing where the mass feed member device 220 has been rotated 180 degrees to facilitate cleaning the mass feed member device 220 by an operator 1210.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A rotary mould drum system configured for use in an installation for moulding food products from a pumpable foodstuff mass while rotating a mould drum around a longitudinal rotation axis by a driving unit, the mould drum system comprising:

a frame structure, a support device connected to the frame structure, having an inner side, the support device being moveable relative to the frame structure between an open position and a closing position, a shaft having a mounting side at which it is mounted to the frame and an opposite free end, where the shaft is configured to receive a hollow cylindrical mould drum having an inner geometrical cross section, the hollow mould drum having an outer mould drum surface comprising plurality of mould cavities having an opening in the mould drum surface, the plurality of mould cavities defining a geometrical shape of food products to be moulded, where an outer geometrical cross section of the shaft is essentially the same as the inner geometrical cross section of the hollow drum so as to allow the hollow cylindrical mould drum to be slideable attached to the shaft at the mounting side when the support device is in the open position, followed by moving the support device to the closing position such that the free end is supported by the inner side of the support device, and a bearing construction, wherein the free end of the shaft comprises a first structure, the inner side of the support device comprises a second complementary structure, where the geometry of the first structure is essentially the same as the geometry of the second complementary structure such that the first structure and the second complementary structure fit into each other when the support device is in the closing position, where the bearing construction is integrated into the support device so as to allow the second complementary structure to follow a rotational movement of the mould drum.

2. The rotary mould drum system according to claim 1, wherein the first structure comprises a first tapering structure and where the second structure comprises a second tapering structure where either one of the first or the second tapering structures are hollow.

3. The rotary mould drum system according to claim 2, wherein the first tapering structure is a first cone structure and where the second tapering structure is a second cone structure.

4. The rotary mould drum system according to claim 3, wherein the first and the second cone structures are truncated cone structures.

5. The rotary mould drum system according to claim 1, further comprising a mass feed member device having an inner partly deformable side, and an outer side framework side, the mass feed member device being pivotable attached to the frame structure and is configured to be moved between an open position and a closing position, the open position being a position where the mass feed member device is in non-contact with the mould drum when being slideable attached to the shaft, the closing position being when the inner partly deformable side circumferentially surrounds the mould drum longitudinally along the mould drum and supplies a pressure thereon, wherein the support device is attached to the outer framework side of the mass feed member device, and where moving the support device to the closing position occurs when the mass feed member device is in the closing position.

6. The rotary mould drum system according to claim 5, wherein the support device comprises a lid and where the inner side of the support device is an inner side of the lid.

7. The rotary mould drum system according to claim 6, wherein the lid is pivotable mounted to the outer framework side of the mass feed member device, and where the open position of the support device is where the lid is in an open position, and where the closing position is where the lid and the mass feed member device are in a closing position.

8. The rotary mould drum system according to claim 1, wherein the first structure has a cylindrical opening therein, and where the support device comprises a locking mechanism comprising a pin structure, where the inner diameter of the cylindrical opening is essentially the same as the outer diameter of the pin structure, where the pin structure is moveable in a linear movement between an open position to a closing position, the closing position being where the pin structure penetrates or is screwed into the cylindrical opening resulting in that the support device is in a closing position.

9. The rotary mould drum system according to claim 1, wherein the first structure is removable from the shaft, or where the first structure is incorporated into the shaft, such that it is an integral part of the shaft.

10. The rotary mould drum system according to claim 1, wherein the support device comprises a bushing mould, and wherein the second complementary structure is formed at an inner side of a bushing mould and where the bearing construction is integrated into the support device at an outer side of the bushing mould.

11. The rotary mould drum system according to claim 1, wherein the support device comprises a cylindrical structure having outwardly protruding portion defining the second complementary structure, where the bearing construction is integrated into the support device at an outer side of the cylindrical structure.

12. A food processing system for moulding food products from a pumpable foodstuff mass, comprising:

a shaft having a mounting side and an opposite free end, a mould drum slideable attached to the shaft and mounted to the shaft at the mounting side, where the mould drum comprises an outer mould drum surface comprising a plurality of mould cavities having an opening in the mould drum surface, the plurality of mould cavities defining a geometrical shape of food products to be moulded, a driving unit connected to the mounting side and configured to rotate the mounting side and thus the mould drum around a longitudinal rotation axis, a mass feed member device having an outer frame structure having at least one inlet opening for receiving a pumpable foodstuff mass, an inner deformable member and a mouth connected to the at least one inlet opening, where the mass feed member is moveable in a hinge like manner from an open position to a closing position, and vice versa, where in the closing position the inner deformable member circumferentially surrounds the mould drum, a support device connected to the frame structure and having an inner side, the support device being moveable between an open position and a closing position, a bearing construction, wherein the free end of the shaft comprises a first structure, the inner side of the support device comprises a second complementary structure, where the geometry of the first structure is essentially the same as the geometry of the second complementary structure such that the first structure and the second complementary structure fit into each other when the support device is in the closing position, where the bearing construction is integrated into the support device so as to allow the second complementary structure to follow a rotational movement of the mould drum.

13. The food processing system of claim 12, wherein the mass feed member is moveable from the closed position, defining a zero-degree position, to approximately 180 degrees position.

14. A method for manufacturing moulded food products, comprising:

providing a food processing system comprising:

a shaft having a mounting side and an opposite free end, a mould drum slideable attached to the shaft and mounted to the shaft at the mounting side, where the mould drum comprises an outer mould drum surface comprising a plurality of mould cavities having an opening in the mould drum surface, the plurality of mould cavities defining a geometrical shape of food products to be moulded, a driving unit connected to the mounting side and configured to rotate the mounting side and thus the mould drum around a longitudinal rotation axis, a mass feed member device having an outer frame structure having at least one inlet opening for receiving a pumpable foodstuff mass, an inner deformable member and a mouth connected to the at least one inlet opening, where the mass feed member is moveable in a hinge like manner from an open position to a closing position, and vice versa, where in the closing position the inner deformable member circumferentially surrounds the mould drum, a support device connected to the frame structure and having an inner side, the support device being moveable between an open position and a closing position, a bearing construction, wherein the free end of the shaft comprises a first structure, the inner side of the support device comprises a second complementary structure, where the geometry of the first structure is essentially the same as the geometry of the second complementary structure such that the first structure and the second complementary structure fit into each other when the support device is in the closing position, where the bearing construction is integrated into the support device so as to allow the second complementary structure to follow a rotational movement of the mould drum;

feeding a pumpable foodstuff mass into the at least one inlet opening of the mass feed member device;

moving the mass feed member device and the support device from the open position to the closing position such that the inner deformable member circumferentially surrounds the mould drum and the first and second complementary structures fit into each other;

rotating the mould drum using the driving unit to form food products in the mould cavities.

* * * * *